United States Patent
Overstreet

(10) Patent No.: US 7,264,260 B2
(45) Date of Patent: Sep. 4, 2007

(54) ADJUSTABLE HITCH

(75) Inventor: Troy E. Overstreet, Sneads, FL (US)

(73) Assignee: Sybelis Investments, Ltd, Sneads, FL (US)

( * ) Notice: Subject to any disclaimer, the term of this patent is extended or adjusted under 35 U.S.C. 154(b) by 17 days.

(21) Appl. No.: 11/194,148

(22) Filed: Aug. 1, 2005

(65) Prior Publication Data

US 2007/0024026 A1  Feb. 1, 2007

(51) Int. Cl.
*B60D 1/46* (2006.01)
(52) U.S. Cl. .............................. 280/490.1; 280/491.1; 280/477; 280/461.1; 280/510
(58) Field of Classification Search .............. 280/490.1, 280/491.1, 477, 461.1, 510
See application file for complete search history.

(56) References Cited

U.S. PATENT DOCUMENTS

| | | | | |
|---|---|---|---|---|
| 2,714,463 A | * | 8/1955 | Fraser | 414/607 |
| 3,891,239 A | * | 6/1975 | Leo et al. | 280/479.1 |
| 4,103,928 A | * | 8/1978 | Sheppard, Jr. | 280/490.1 |
| 4,148,499 A | * | 4/1979 | Johnson | 280/490.1 |
| 4,564,209 A | * | 1/1986 | Kingsley et al. | 280/468 |
| 6,155,588 A | * | 12/2000 | Maxey | 280/488 |
| 6,273,448 B1 | * | 8/2001 | Cross | 280/477 |
| 6,341,794 B1 | * | 1/2002 | Hunter | 280/477 |
| 2003/0006581 A1 | * | 1/2003 | Moss et al. | 280/416.1 |
| 2004/0155430 A1 | * | 8/2004 | Zahn | 280/416.1 |

* cited by examiner

*Primary Examiner*—Lesley D. Morris
*Assistant Examiner*—Marlon Arce-Diazm
(74) *Attorney, Agent, or Firm*—J. Wiley Horton

(57) ABSTRACT

A quick attach/detach adjustable hitch which allows the operator of a towing vehicle to connect to a trailer without leaving the driver seat. The preferred embodiment includes a lifting carriage connected within a frame by a hydraulic cylinder. Guiding members are used to ensure correct alignment of the hitch ball receiver and hitch ball, and a hold-down bar is used to prevent accidental detachment of the trailer from the towing vehicle. The preferred embodiment also includes an alarm to inform the operator when the hitch ball receiver and hitch ball are in correct alignment.

14 Claims, 10 Drawing Sheets

ADJUSTABLE HITCH

BACKGROUND OF THE INVENTION

1. Field of the Invention

This invention relates generally to a device which can be used to hitch vehicles, trailers, and the like. More specifically, the invention comprises an adjustable hitch which can be used to hitch vehicles, trailers, and the like without requiring the operator to leave the driver seat.

2. Description of the Related Art

Hitches are commonly used to tow vehicles and trailers. Many types of hitch mechanisms are known in the art, including hitches which can be raised or lowered. Despite the existence of these various mechanisms there is a need to have an adjustable hitch which can be used to hitch a trailer to a vehicle without requiring the operator of the vehicle to leave the driver seat. This is especially true in applications where the frequent hitching and unhitching of trailers is contemplated.

One example of such an application is in the harvesting of crops. Some harvesters use trailers to haul harvested crops. Since unloading the trailers can be laborious and time consuming, it is often desirable to utilize multiple trailers. Typically, an operator of a tractor will tow an empty trailer to the field to collect harvested crops. When the trailer is full, the harvester brings it back to the storage area and disconnects it. Another empty trailer is then connected to the tractor and brought back to the field to collect more harvest. This process is repeated until all of the harvested crops are collected in trailers. Those that are skilled in the art appreciate that the time taken to connect and disconnect trailers alone can easily exceed two hours a day. Accordingly, it would be beneficial to have a hitch which can be quickly connected and disconnected.

BRIEF SUMMARY OF THE INVENTION

The present invention comprises a quick attach/detach adjustable hitch which allows the operator of a towing vehicle to connect to a trailer without leaving the driver seat. The preferred embodiment includes a lifting carriage connected within a frame by a hydraulic cylinder. Guiding members are used to ensure correct alignment of the hitch ball receiver and hitch ball, and a hold-down bar is used to prevent accidental detachment of the trailer from the towing vehicle. The preferred embodiment also includes an alarm to inform the operator when the hitch ball receiver and hitch ball are in correct alignment.

Figure 1:
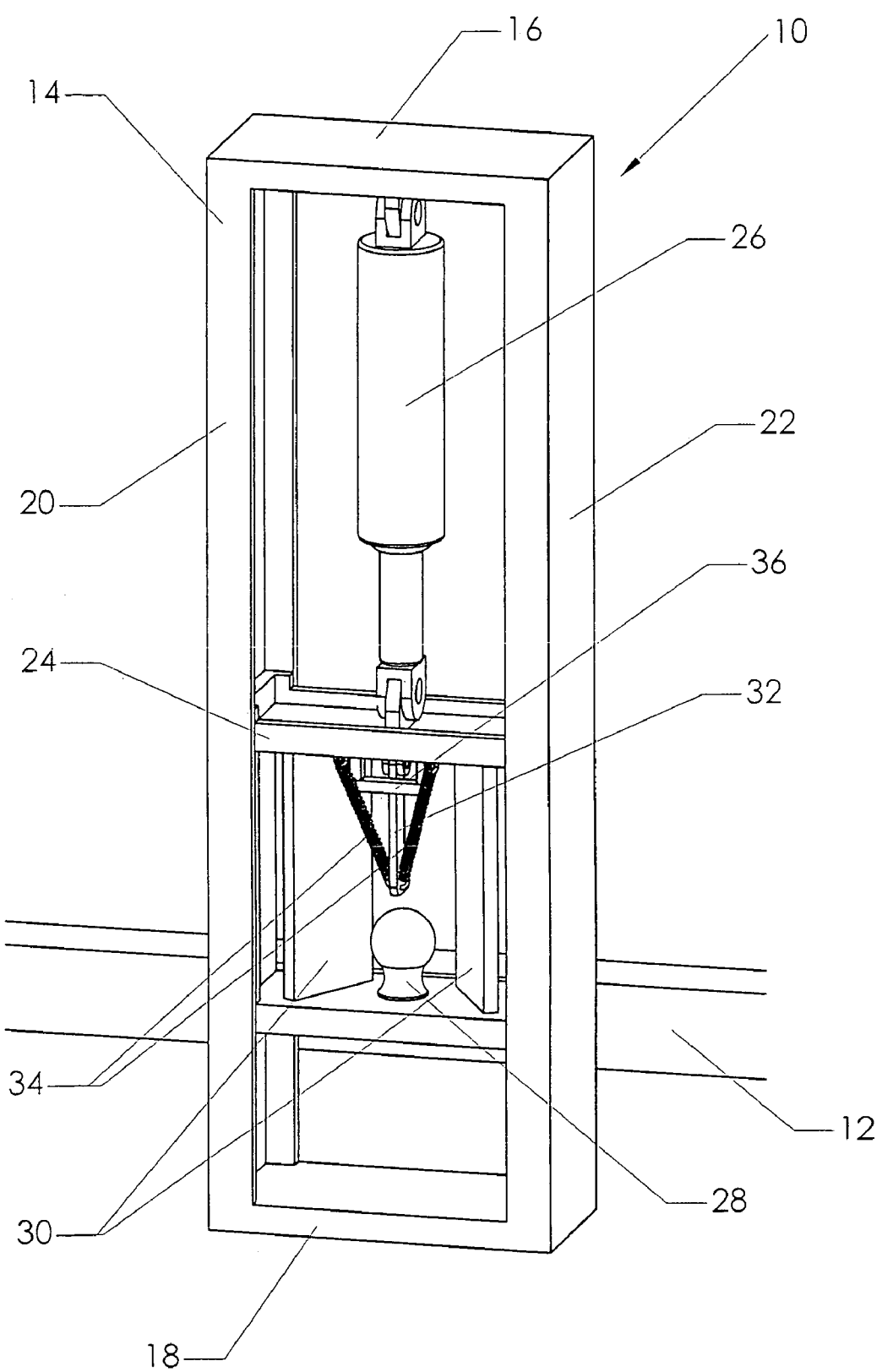
FIG. 1 is a perspective view, showing the present invention.

REFERENCE NUMERALS IN THE DRAWINGS 10 adjustable hitch 12 chassis
14 hitch frame 16 upper frame member
18 lower frame member 20 left frame member
22 right frame member 24 lifting carriage
26 hydraulic cylinder 28 hitch ball
30 guiding members 32 hold-down bar
34 springs 36 stop bar
38 left carriage member 40 right carriage member
42 top carriage member 44 bottom carriage member
46 cylinder connector 48 connector bore
50 pivot joint 52 cable
54 hitch ball receiver 56 wheel
58 lever arm 60 pivot
62 electric switch 64 alignment alarm

DESCRIPTION OF THE INVENTION

The present invention is shown in its entirety in FIG. 1. Adjustable hitch 10 is generally composed of lifting carriage 24 situated within a rectangular frame. The rectangular frame is attached to chassis 12 of a vehicle such as tractor. The rectangular frame has upper frame member 16, left frame member 20, lower frame member 18, and right frame member 22. The various frame members are ideally made of a sturdy material such as steel. As illustrated in FIG. 1, left frame member 20 and right frame member 22 preferably have a U-shaped cross-section, the purpose of which will be explained subsequently.

Hydraulic cylinder 26 is mounted within the rectangular frame and is used to raise and lower lifting carriage 24. As illustrated in FIG. 1, hydraulic cylinder 26 is attached to upper frame member 16 and the top of lifting carriage 24. Although hydraulic cylinder 26 is shown, it is understood that other lifting means can be used to raise and lower lifting carriage 24. Such other lifting means include but are not limited to pneumatic cylinders, motor-driven jack screws, cable winches and post-and-carrier assemblies.

Lifting carriage 24 is situated within the U-shaped cross sections of left frame member 20 and right frame member 22. This feature allows lifting carriage 24 to move up and down within the rectangular frame but restricts the lateral movement of lifting carriage 24.

Lifting carriage 24 has hitch ball 28 for attaching adjustable hitch 10 to a trailer. Lifting carriage 24 also includes hold-down bar 32 which is situated above hitch ball 28. This feature ensures that the trailer is not unintentionally detached from adjustable hitch 10, as will be explained subsequently. Hold-down bar 32 is spring biased to the "down" position by springs 34 and stop bar 36. Guiding members 30 are also provided on opposite sides of hitch ball 28 to ensure correct alignment of hitch ball 28 with the trailer. As shown in FIG. 1, guiding members 30 are angled inward to force the hitch ball receiver of the trailer over hitch ball 28. The reader will appreciate that even if the trailer and hitch ball 28 are slightly misaligned, guiding members 28 will cause the hitch ball receiver to come into alignment with hitch ball 28 when the vehicle is reversed toward the trailer.

Figure 2:
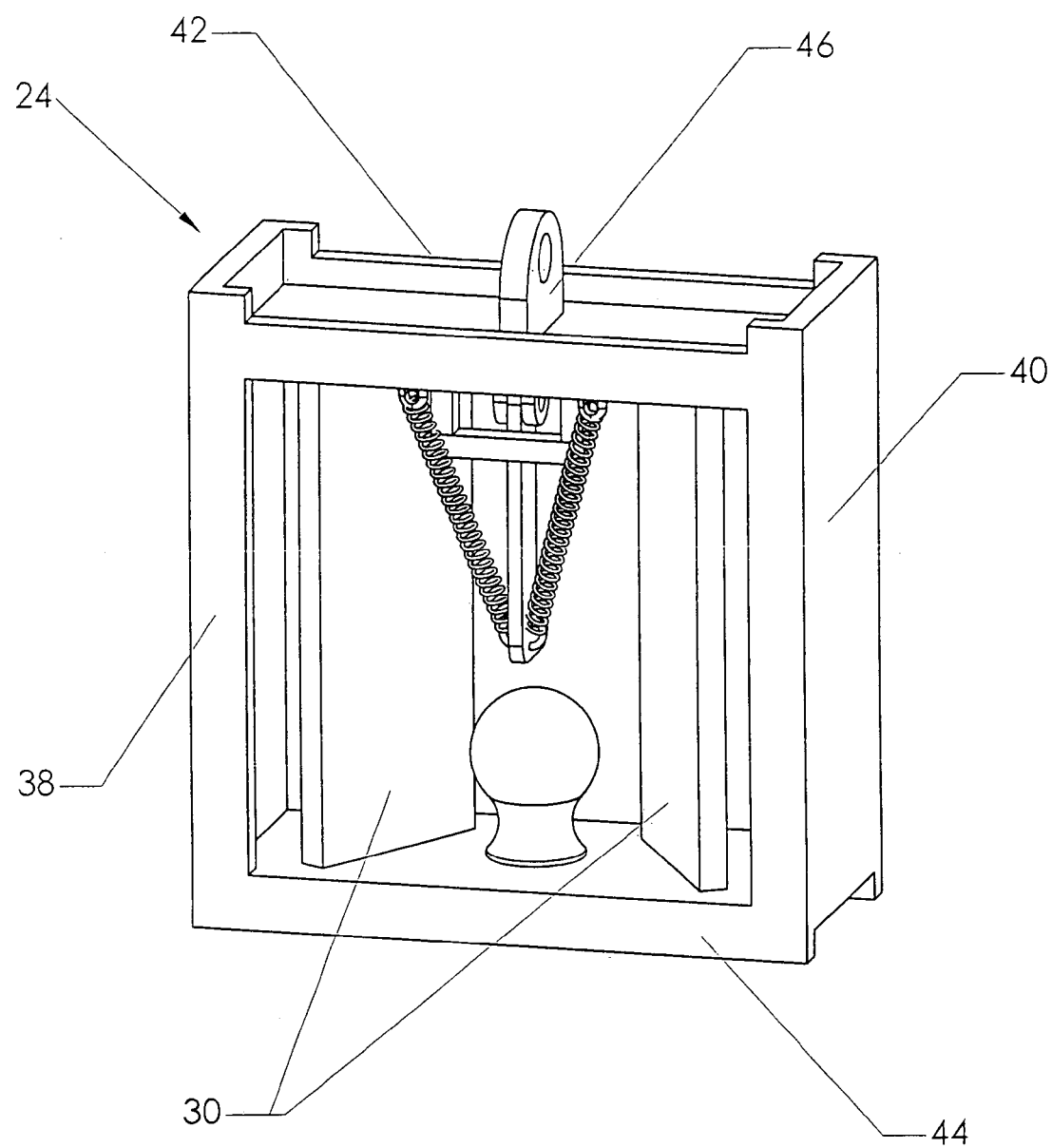
FIG. 2 is a perspective view, showing a lifting carriage.

Lifting carriage 24 is shown removed from the rectangular frame in FIG. 2. In the preferred embodiment, the frame of lifting carriage 24 is generally composed of left carriage member 38, right carriage member 40, top carriage member 42, and bottom carriage member 44. Left carriage member 38 and right carriage member 40 are small enough to slidably fit inside of the interior of the U-shaped cross section of left frame member 20 and right frame member 22.

Cylinder connector 46 is also provided on top of top carriage member 42 for connecting lifting carriage 24 with hydraulic cylinder 26.

Figure 3:
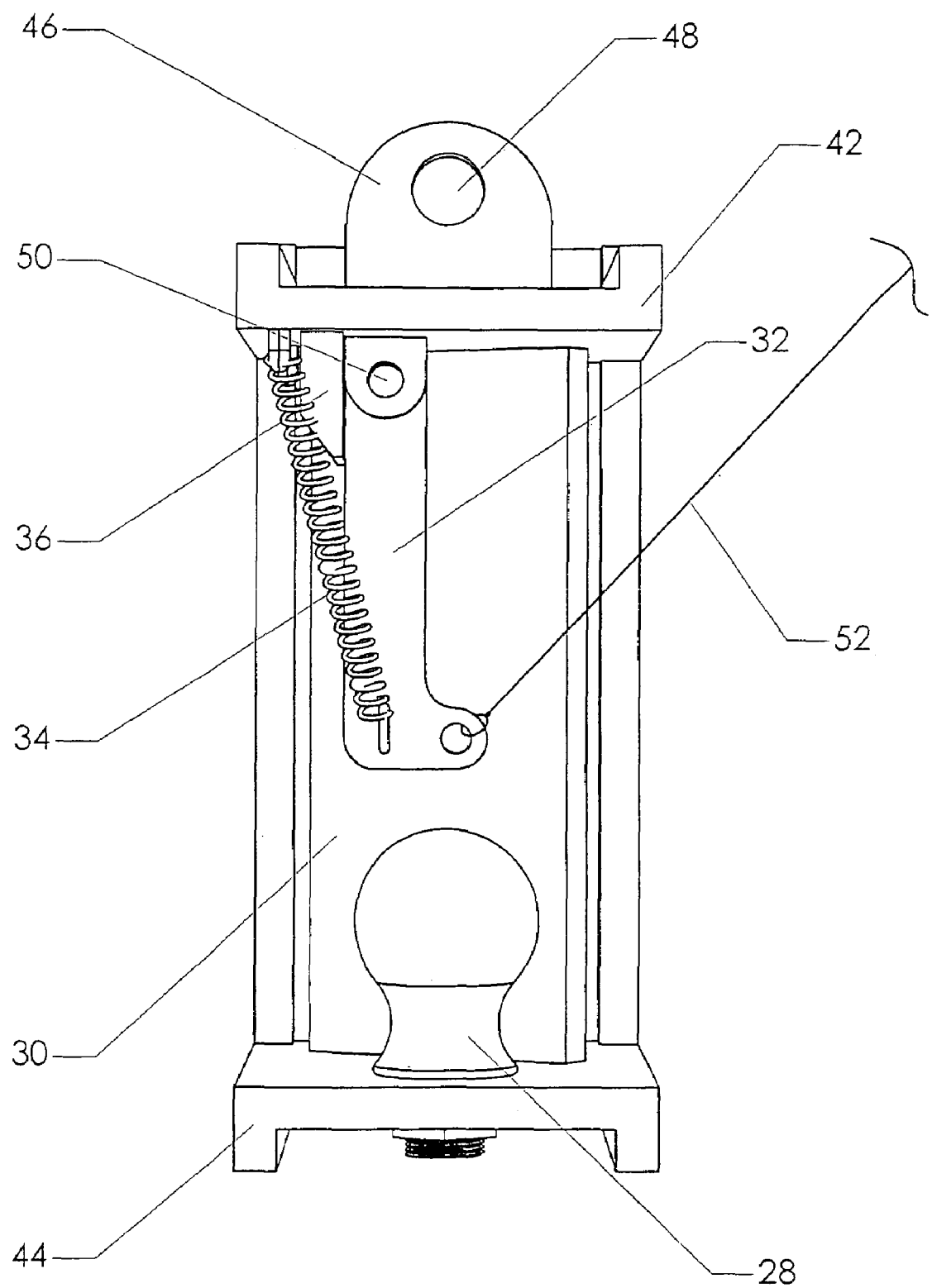
FIG. 3 is a cutaway view, showing a lifting carriage.

FIG. 3 shows a section view of lifting carriage 24 to better illustrate the operation of hold-down bar 32. Hold-down bar 32 is connected to top carriage member 42 with pivot joint 50. Springs 34 are positioned along either side of hold-down bar 32 to bias hold-down bar in the downward position. Stop bar 36 is provided to limit the clockwise rotation of hold-down bar 32. Cable 52 is attached to hold-down bar 32 and is used to pull hold-down bar 32 out of the way when detaching the trailer from hitch ball 28.

Figure 4:
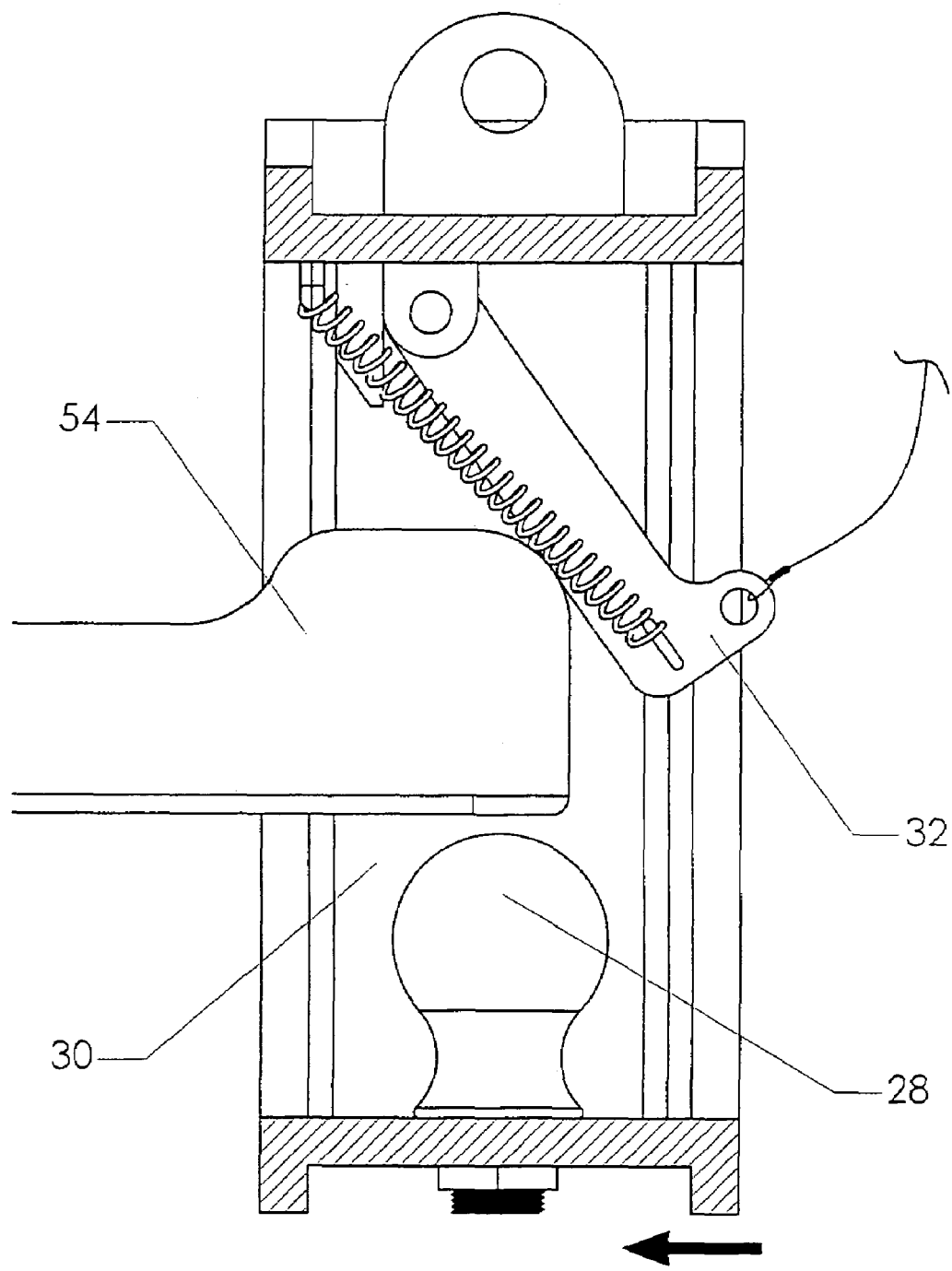
FIG. 4 is a cutaway view, showing the invention in use.
Figure 5:
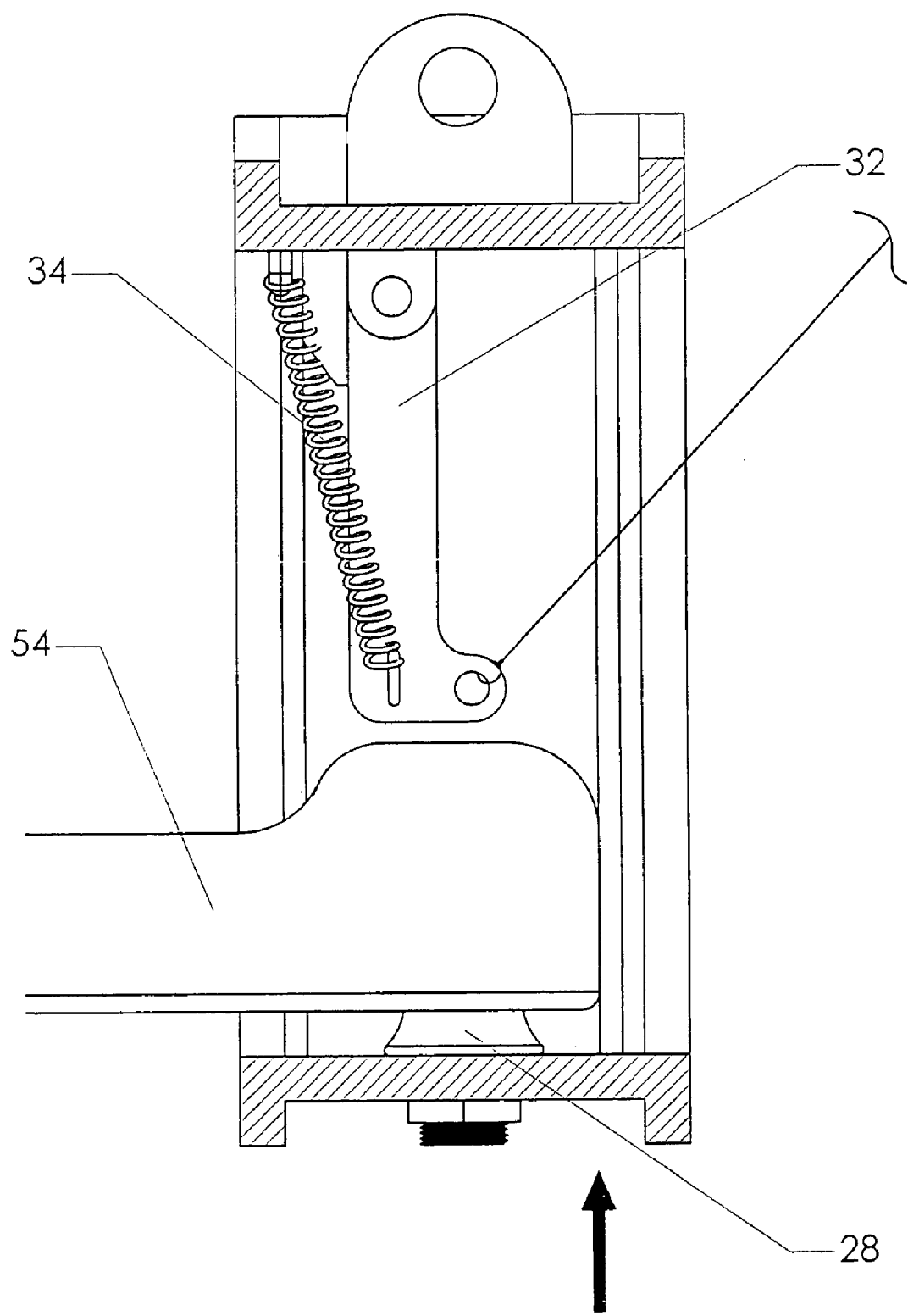
FIG. 5 is a cutaway view, showing the invention in use.
Figure 6:
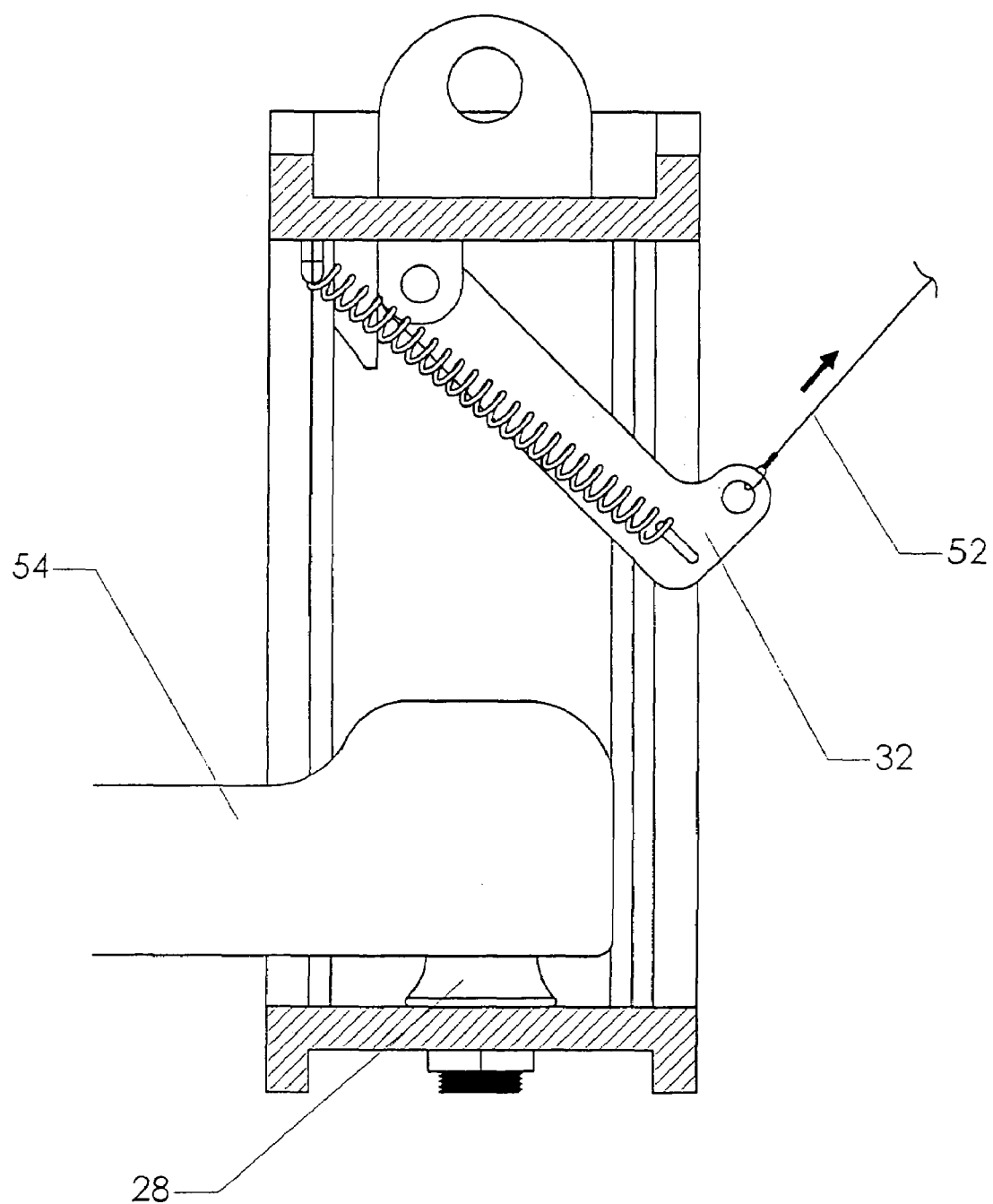
FIG. 6 is a cutaway view, showing the invention in use.

The operation of the present invention is shown in FIGS. 4-6. FIG. 4 shows how hitch ball receiver 54 of the trailer is brought into alignment with hitch ball 28. Lifting carriage 24 is first dropped into the lowered position so that hitch ball 28 is lower than hitch ball receiver 54. As the operator reverses the vehicle into the trailer (moving from right to left in the view), hitch ball receiver 54 forces hold-down bar 32 to rotate clear of hitch ball 28 (the position of hold down-bar 32 when it is rotated clear of hitch ball 28 is also referred to the "forward" position). As described previously, guiding members 30 direct hitch ball receiver 52 into position above hitch ball 28.

As illustrated in FIG. 5, lifting carriage 24 is then raised causing hitch ball receiver 54 to become seated on hitch ball 28. Springs 34 rotate hold-down bar 32 to return to its normal vertical position (also referred to as the "down" position) above hitch ball receiver 54. The reader will appreciate that even if a bump were to cause hitch ball receiver 54 to separate from contact with hitch ball 28, hold-down bar 32 does not provide enough clearance for hitch ball receiver 54 to become completely detached from hitch ball 28. This feature effectively secures the trailer to adjustable hitch 10 so that the operator is not required to leave his seat to secure the connection.

Those that are skilled in the art will appreciate that adjustable hitch 10 can be used with any standard trailer. Many standard trailers have a jack in the front of the trailer which keeps the trailer in an upright position when the trailer is not attached to a towing vehicle. When lifting carriage 24 is raised, the reader will appreciate that the jack of the trailer rises with the trailer so that the jack does not drag on the ground.

When the operator is ready to detach the trailer from the towing vehicle, the operator pulls cable 52, thereby placing cable 52 under tension and rotating hold-down bar 32 into the forward position, as shown in FIG. 6. Lifting carriage 24 is then lowered until hitch ball receiver 54 is clear of hitch ball 28. The operator then pulls the vehicle forward, and the vehicle and trailer become detached. The operator can then repeat the procedure on another trailer.

Those that are skilled in the art know that there are many ways that cable 52 can be made available for pulling for the operator. One way is to simply run the cable up to the driver seat and provide a grip so that the operator can directly grab and pull the cable. The cable can also be attached to a lever arm which is kept near the driver. The lever arm can be provided with two locked positions—one position for when the operator desires to maintain hold-down bar 32 in the downward position and a second position for when the operator desires to maintain hold-down bar 32 in the forward position. Other mechanical devices can be used to accomplish the same purpose, such as an electrically-operated solenoid. As these devices are known, a detailed description of them is omitted herein.

Figure 7:
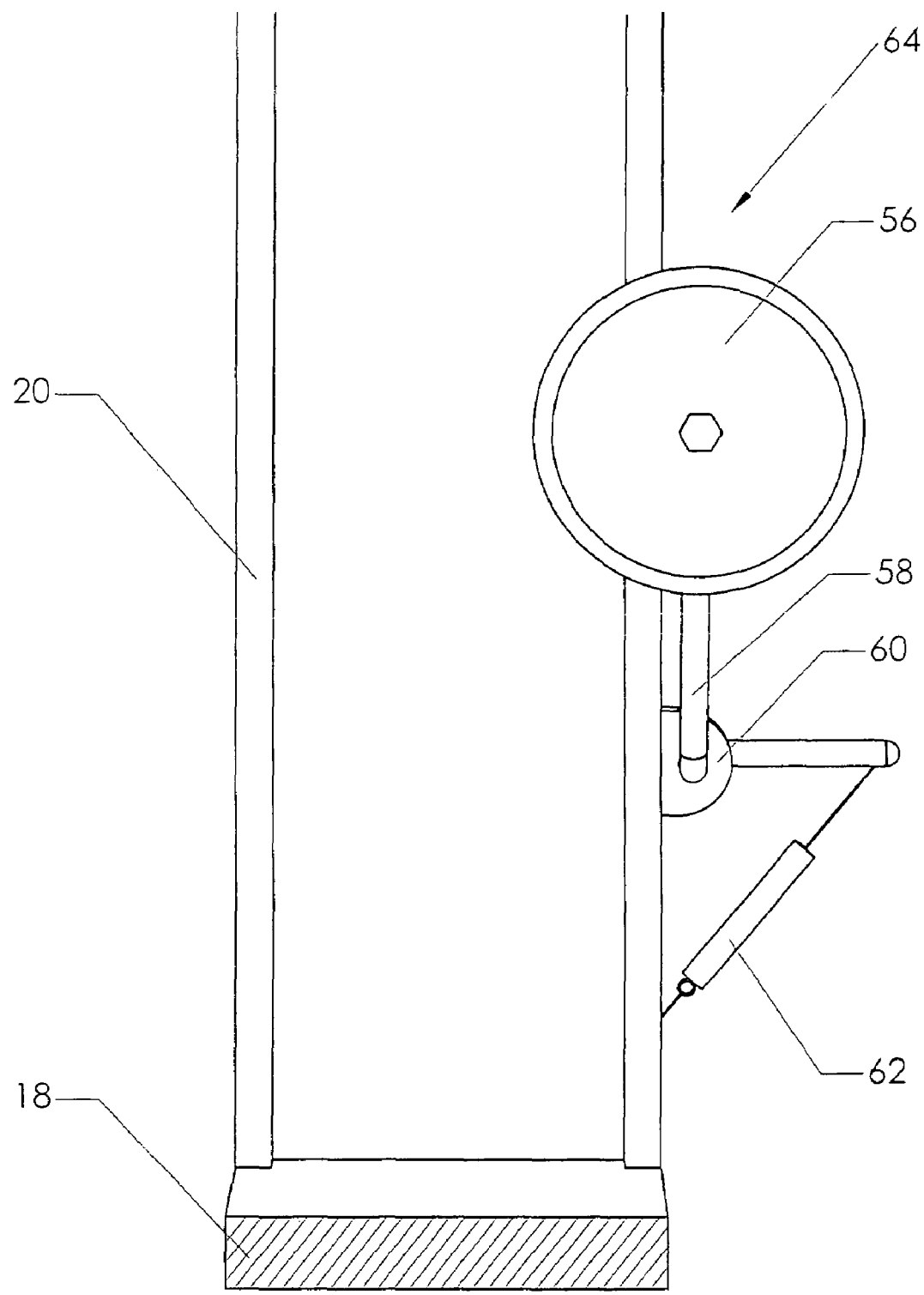
FIG. 7 is a perspective view, showing an alignment alarm.

An alignment alarm is shown in FIG. 7. Alignment alarm 64 is provided to notify the operator when hitch ball receiver 54 and hitch ball 28 are aligned. Alignment alarm 64 is generally composed of wheel 56 attached to lever arm 58. Lever arm 58 is attached to the rectangular frame (shown here attached to left frame member 20) by pivot 60. Although lever arm 58 is illustrated attached to left frame member 20, it could be attached to other locations as well such as lower frame member 18, right frame member 22, top frame member 16 or chassis 12. Lever arm 58 generally has two ends. The first end is attached to wheel 56 and the second end is attached to electric switch 62. Electric switch 62 and lever arm 58 are configured so that movement of lever arm 58 causes activation of electric switch 62. When electric switch 62 is activated, an alarm, such as an audible alarm, which is ideally positioned near the operator is activated. Lever arm 58 can be spring-biased so that wheel 56 extends into the rectangular frame when in the default position.

Figure 8:
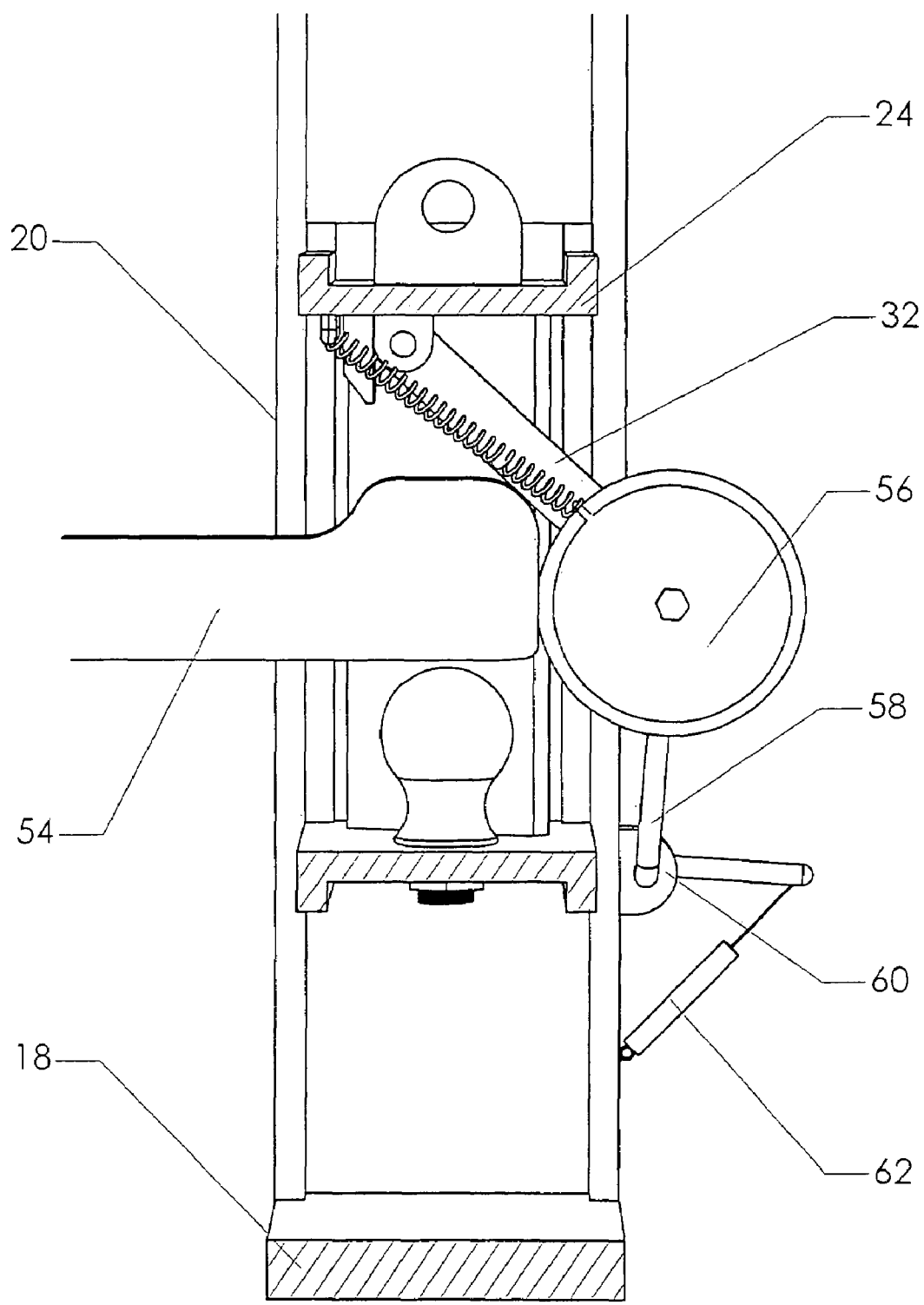
FIG. 8 is a perspective view, showing an alignment alarm in use.
Figure 9:
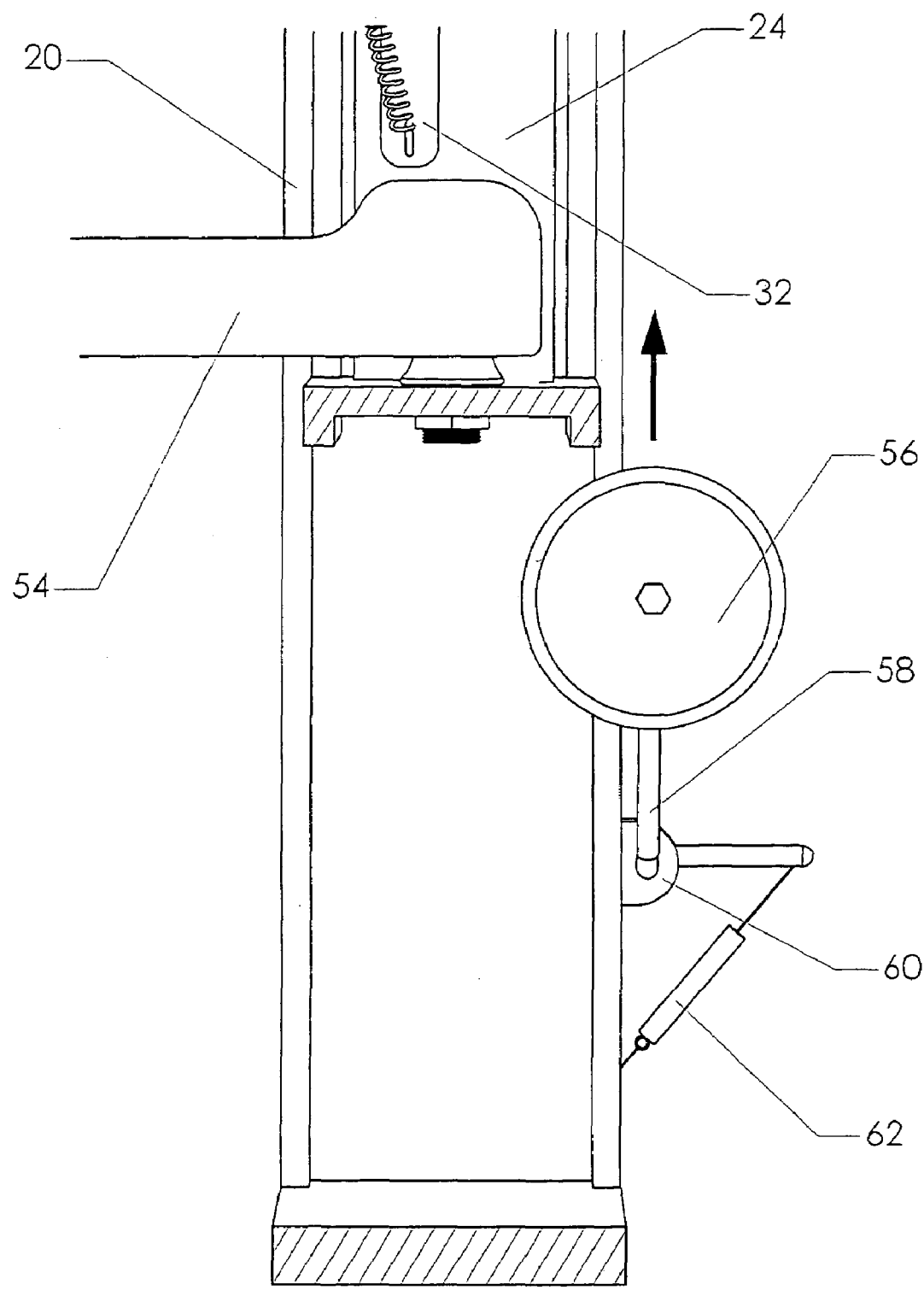
FIG. 9 is a perspective view, showing an alignment alarm in use.

The operation of alignment alarm 64 is illustrated in FIGS. 8 and 9. In FIG. 8, lifting carriage 24 is positioned in the lowered position so that the hitch ball is lower than hitch ball receiver 54. As the operator of the towing vehicle reverses toward the trailer, hitch ball receiver 54 rotates hold-down bar 32 counter-clockwise as described previously. Hitch ball receiver 54 also pushes wheel 56 forward causing lever arm 58 to pivot about pivot 60 thereby activating electric switch 62. In the preferred embodiment, an audible alarm is sounded near the operator as long as the wheel is pushed forward. This notifies the operator that hitch ball receiver 54 is in position over the hitch ball. As shown in FIG. 9, wheel 56 returns to its default position once lifting carriage 24 is raised. Electric switch 62 is deactivated shutting off the alarm and notifying the operator of the towing vehicle that hitch ball receiver 54 is connected to adjustable hitch 10. The reader will appreciate that the cessation of the alarm also indicates that the trailer has been raised so that the trailer jack is no longer on the ground. The operator can now tow the trailer.

Figure 10:
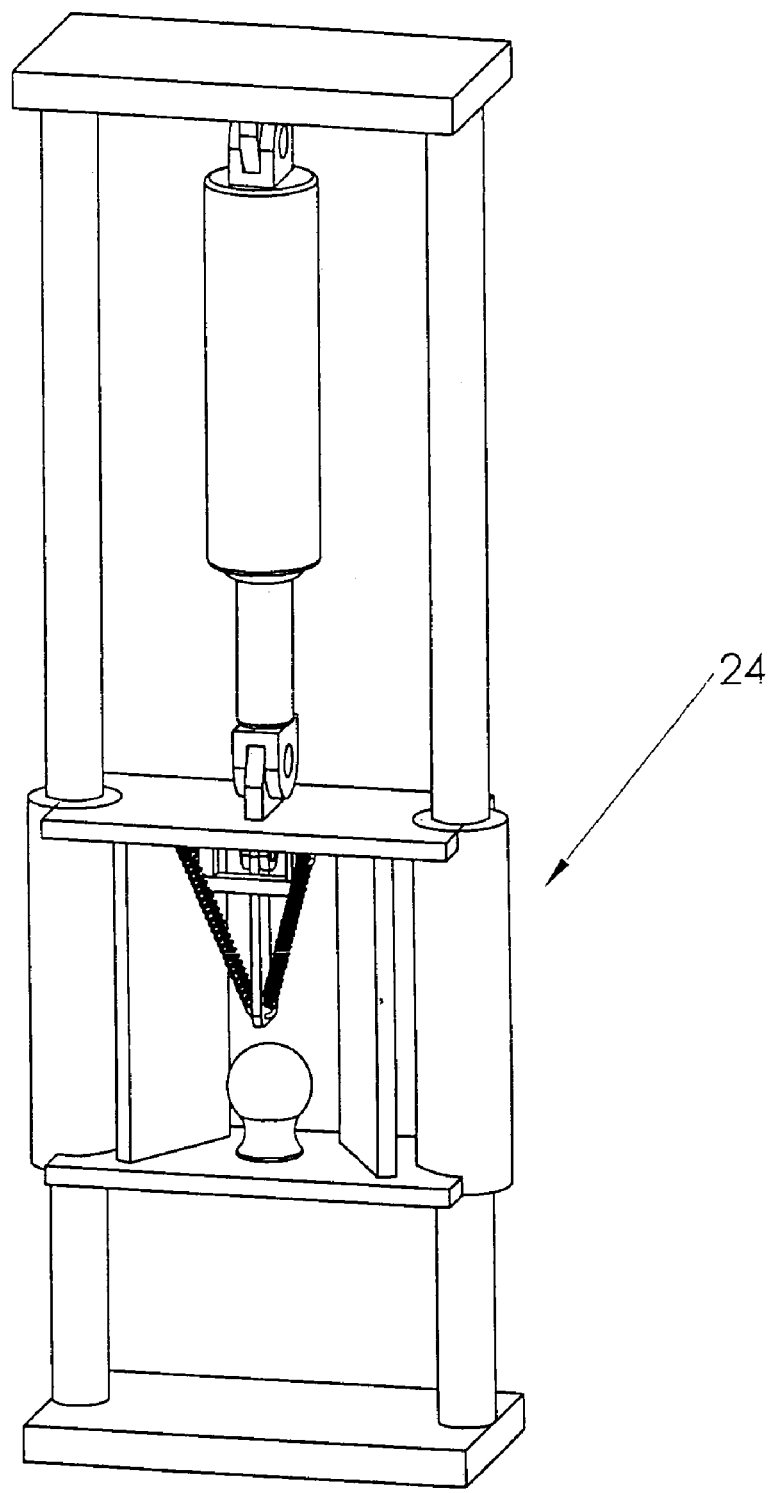
FIG. 10 is a perspective view, showing an alternate embodiment of the present invention.

Although the preceding description contains significant detail, it should not be construed as limiting the scope of the invention but rather as providing illustrations of the preferred embodiments of the invention. As an example, the rectangular frame and lifting carriage 24 can take many forms. It is also within the spirit and scope of the present invention to have a rod-in-sleeve connection between lifting carriage 24 and the frame as shown in FIG. 10. Accordingly, the scope of the invention should be defined by ensuing patent claims and not the examples given.

I claim:

1. An adjustable hitch for attaching a trailer to a towing vehicle, said towing vehicle operated by an operator, wherein said trailer includes a hitch ball receiver having a cavity, said adjustable hitch comprising:
   a. a lifting carriage movable up and down, including
      i. a hitch ball,
      ii. a hold-down bar, said hold down bar positioned above said hitch ball and adapted to hold said hitch ball receiver on top of said hitch ball so that said hitch ball is trapped inside said cavity of said hitch ball receiver;
   b. a lifting means, said lifting means attached to said lifting carriage and adapted for raising said lifting carriage in the vertical direction; and
   c. wherein said hold down bar is configured to be movable between a downward position in which said hold down bar is proximal to said hitch ball and a forward positioning which said hold down bar is distal to said hitch ball, and wherein said hold down bar is spring biased to be maintained in said downward position above said hitch ball.

2. The adjustable hitch of claim 1, wherein said lifting carriage further comprises a first guiding member and a second guiding member, said first guiding member and said second guiding member positioned on opposite sides of said hitch ball.

3. The adjustable hitch of claim 1, wherein said adjustable hitch further comprises an alignment alarm adapted to notify said operator when said hitch ball receiver is aligned with said hitch ball.

4. The adjustable hitch of claim 2, wherein said adjustable hitch further comprises an alignment alarm adapted to notify said operator when said hitch ball receiver is aligned with said hitch ball.

5. The adjustable hitch of claim 1, further comprising a cable, said cable attached to said hold down bar and adapted to position said hold down bar in said forward position when said cable is under tension.

6. The adjustable hitch of claim 2, further comprising a cable, said cable attached to said hold down bar and adapted to position said hold down bar in said forward position when said cable is under tension.

7. The adjustable hitch of claim 3, further comprising a cable, said cable attached to said hold down bar and adapted to position said hold down bar in said forward position when said cable is under tension.

8. The adjustable hitch of claim 4, further comprising a cable, said cable attached to said hold down bar and adapted to position said hold down bar in said forward position when said cable is under tension.

9. The adjustable hitch of claim 1, further comprising a hitch frame, said hitch frame adapted for attaching said adjustable hitch to said towing vehicle.

10. The adjustable hitch of claim 1, wherein said lifting means comprises a hydraulic cylinder.

11. The adjustable hitch of claim 1, wherein said hold-down bar is rotatably attached to said lifting carriage so that said hold-down bar has a normal vertical orientation, and said hold-down bar rotates clear of said hitch ball when said hitch ball receiver is brought into alignment above said hitch ball.

12. An adjustable hitch for attaching a trailer to a towing vehicle, wherein said trailer includes a hitch ball receiver having a cavity, said adjustable hitch comprising:
 a. a frame attached to one of said trailer or said towing vehicle,
 b. a lifting carriage movable up and down within said frame, said lifting carriage including a hitch ball,
 c. a lifting means, said lifting means attaching said lifting carriage to said frame and adapted to raise and lower said lifting carriage within said frame; and
 d. a hold-down bar, said hold down bar positioned above said hitch ball and adapted to hold said hitch ball receiver on top of said hitch ball so that said hitch ball is trapped inside said cavity of said hitch ball receiver.

13. The adjustable hitch of claim 12, wherein said hold down bar is configured to be movable between a downward position in which said hold down bar is proximal to said hitch ball and a forward positioning which said hold down bar is distal to said hitch ball, and wherein said hold down bar is spring biased to be maintained in said downward position above said hitch ball.

14. The adjustable hitch of claim 12, said lifting carriage further comprising a first guiding member and a second guiding member, said first guiding member and said second guiding member positioned on opposite sides of said hitch ball, said first guiding member and said second guiding member together configured to direct said hitch ball receiver into alignment with said hitch ball as said hitch ball receiver moves toward said hitch ball.

* * * * *